United States Patent [19]

Gross

[11] Patent Number: 5,406,605
[45] Date of Patent: Apr. 11, 1995

[54] METHOD FOR DESIGNING GAS TAG COMPOSITIONS

[75] Inventor: Kenny C. Gross, 1433 Carriage La., Bolingbrook, Ill. 60440

[73] Assignee: Kenny C. Gross, Argonne, Ill.

[21] Appl. No.: 174,227

[22] Filed: Dec. 28, 1993

[51] Int. Cl.⁶ .................. G21C 3/00; G21C 21/02
[52] U.S. Cl. .................. 376/463; 376/253; 376/450
[58] Field of Search ............... 376/245, 251, 252, 253, 376/259, 450, 463

[56] References Cited

U.S. PATENT DOCUMENTS 3,959,069  5/1976  McCormick .................. 376/253

OTHER PUBLICATIONS

Nuclear Technology, vol. 24, Nov. 1974, pp. 156–162, 164–167, McCormick.
Trans. Am. Nuc. Soc., vol. 27, (1977), p. 685, Gross et al.

Primary Examiner—Behrend E. Harvey
Attorney, Agent, or Firm—Emrich and Dithmar

[57] ABSTRACT

For use in the manufacture of gas tags such as employed in a nuclear reactor gas tagging failure detection system, a method for designing gas tagging compositions utilizes an analytical approach wherein the final composition of a first canister of tag gas as measured by a mass spectrometer is designated as node #1. Lattice locations of tag nodes in multi-dimensional space are then used in calculating the compositions of a node #2 and each subsequent node so as to maximize the distance of each node from any combination of tag components which might be indistinguishable from another tag composition in a reactor fuel assembly. Alternatively, the measured compositions of tag gas numbers 1 and 2 may be used to fix the locations of nodes 1 and 2, with the locations of nodes 3-N then calculated for optimum tag gas composition. A single sphere defining the lattice locations of the tag nodes may be used to define approximately 20 tag nodes, while concentric spheres can extend the number of tag nodes to several hundred.

9 Claims, 5 Drawing Sheets

METHOD FOR DESIGNING GAS TAG COMPOSITIONS

CONTRACTURAL ORIGIN OF THE INVENTION

The United States government has rights in this invention pursuant to Contract No. W-31-109-ENG-38 between the U.S. Department of Energy and the University of Chicago representing Argonne National Laboratory.

FIELD OF THE INVENTION

This invention relates generally to the analytical design of gas tagging compositions for identification of failed fuel assemblies in large nuclear reactors such as commercial light water reactors (LWRs) and is particularly directed to a method for designing gas tags which accommodates inaccuracies inherent in the tag blending procedure for producing tag gases of more precisely specified compositions.

BACKGROUND OF THE INVENTION

A gas tagging failed fuel assembly detection system is shown in simplified conceptual form in FIG. 1. Gas tagging for failed fuel identification in nuclear reactors involves the addition of a small amount of stable noble gas isotopes to the helium fill gas of each of the reactor's fuel rods 12. The same composition of tag gas isotopes is used in every rod 12 in a given fuel assembly 14, with the gas composition systematically varied from one assembly to the next throughout the nuclear reactor 16. When a fuel rod 12 fails, it releases a portion of its tag gas 11 into the reactor's primary coolant system 18. Using a mass spectrometer 20, the detection system 10 "sniffs" a small gas sample from the primary coolant system to determine the assembly (or assemblies) containing the leaking fuel rod(s).

Each gas tag has a prespecified isotopic composition in terms of the ratios of the constituent isotopes with respect to one another, or, equivalently, in terms of the mole percent of each constituent isotope. To produce a canister of tag gas with the desired isotopic composition, several canisters of feed gas from a commercial enriched-gas supplier are used. Each feed gas blend has a unique isotopic composition determined by the physical enrichment process (either thermal diffusion or gas centrifuge) used to enhance the abundance of the individual isotopes for each noble gas species. In general, there is a very wide range of costs for each available feed gas blend. The unit costs of feed gas blends can easily vary by three orders of magnitude between natural-abundance feed gas (whose mole percents are the same as those which occur naturally in the air, requiring no enrichment) and highly enriched blends, which have high mole fractions of those isotopes characterized by a low natural abundance.

For purposes of illustration, Table I shows a set of eight hypothetical feed gas mixtures, each of which comprises four isotopes. The isotopic compositions for each feed gas are typical of those obtainable from an enriched-gas supplier by thermal diffusion, and the range of costs is typical of the costs for enriched stable noble gases. While Table I contains information relating to the gas blending procedure for eight hypothetical four-component feed gases, the method discussed herein is applicable to virtually any number of feed gas mixtures comprising any number of constituent components.

TABLE I

| Feed Gas Mixture No. | Mole % | | | | Cost $/L |
|---|---|---|---|---|---|
| | Isotope 1 | Isotope 2 | Isotope 3 | Isotope 4 | |
| 1 | 10 | 35 | 15 | 40 | $800 |
| 2 | 20 | 30 | 12 | 38 | 1350 |
| 3 | 30 | 27 | 11 | 32 | 2100 |
| 4 | 40 | 24 | 16 | 20 | 3400 |
| 5 | 50 | 20 | 20 | 10 | 5500 |
| 6 | 60 | 15 | 15 | 10 | 6800 |
| 7 | 70 | 12 | 8 | 10 | 9500 |
| 8 | 80 | 6 | 6 | 8 | 11200 |

Costs and Enrichments for Eight Example Feed Gas Mixtures

There are a fixed number of noble gas isotopic mixtures commercially available which encompass a wide range of costs. To obtain a target composition for a desired gas tag, there are infinitely many ways to blend the eight available feed gases and produce the required isotopic mole percents. These blends span a very large range of costs. A non-trivial optimization problem arises when the objective is to find which combination of eight or less input gases produces the minimum overall tag cost, while satisfying the analytical constraints imposed by the target isotopic ratios and the physical constraint that the proportion of each feed gas must be non-negative.

The prior art in this area employs two approaches for solving the tag blend optimization problem, each of which has limitations when employed in a commercial production-scale operation. One approach, developed by the Experimental Breeder Reactor-II (EBR-II) at Argonne National Laboratory in the early 1970's, involves computing a graphical control chart capable of accommodating only three feed gases and minimizing the use of the most expensive isotope. An example of this control chart for EBR-II's xenon tags is shown in graphic form in FIG. 2. This control-chart approach was relatively convenient at the time it was devised before the advent of personal computers, but produced tag blends that were suboptimal with respect to cost. The cost penalties estimated by comparing control-chart blends with blends obtained from optimization techniques described below, averaged 30% of the tag cost when the same three fuel gas blends are used. This is not a severe penalty for a small research reactor such as EBR-II, but results in sizable economic penalties for a commercial type reactor involving the use of as many as $10^5$ pins per core where the cost difference per pin may be as great as $2.00.

A second prior art attempt at tag blend optimization involves a computer implementation of a detailed analytical solution to the constrained optimization problem which suffers from computational complexity. In this approach, a problem involving ten feed gases with five analytical constraints is mapped into a system of 15 nonlinear simultaneous equations, which is transformed into a system of 15 linear simultaneous ordinary differential equations (ODEs). One difficulty in this approach is that the solution requires an input "guess" of the solution vector. For constrained optimization problems of this nature, there are very many widely separated local minima and there is no way, a priori, to select a starting vector that will ensure convergence to the overall global minimum. To avoid this difficulty prior approaches sought to supply a very large number of starting-guess vectors and solve the complete system of 15 ODEs for all starting vectors. This approach, which requires a large supercomputer to blend a small system of tags, would not be practical for a large scale commercial operation.

Still another problem with prior art approaches to tag gas manufacture involves the actual physical procedure employed in blending the tags after the optimal blend composition is obtained by one of the procedures discussed above. The blending process entails manual connection and disconnection of gas cylinders, and opening and closing of a complex system of valves connecting purge lines, feed-gas lines, vacuum lines and compressor lines. This procedure is lengthy, manpower intensive, error prone, wasteful of gas, and laborious for the gas chemist.

One of the early difficulties encountered with the gas tagging technique for identifying failed fuel assemblies (assemblies containing one or more defective elements) was distinguishing between single- and multiple-assembly failures. In particular, simultaneous tag release from elements in two or more assemblies may give rise to a daughter tag, the composition of which is indistinguishable from the tag of some other assembly. A prior art concentric-sphere design which provides a compact tag node configuration is described below as it relates to the present invention. A limitation in this approach in designing gas tag compositions arises because the locations of the tag nodes specified with the analytical design such as the concentric sphere design are not precise points in composition space. Rather, these nodes may "move" in random directions by as much as 5% of their euclidian distance from the origin during the tag blending procedure. Contributions to this 5% variation include inaccuracies in pressure and flow parameters in the filling equipment, and the possibility of trace amounts of residual isotopes remaining in the filling tubes from previously blended tags. This modest variation does not present a problem in identification of single assembly failures because the final tag compositions for the blended tag are measured via mass spectrometry. It is the measured compositions that are input into tag searching algorithms for accurate identification, not the pre-specified "theoretical" compositions. However, small shifts in node compositions arising during the filling procedure adversely affect the likelihood of misidentification from double-assembly failures. This is because a 5% random shift in a lattice node position for a tag node can cause that node to coincide with a tie line connecting two other nodes. As described below, this can cause confusion between single- and double-assembly failures and may potentially result in the wrong assemblies being removed from the reactor's core.

There is no way to completely eliminate inaccuracies in the tag blending procedure. For small configurations of gas tags such as for the EBR-II system this is not a major problem, since the nodes can be spaced sufficiently far apart to make misidentifications highly unlikely. However, for larger tagging system designs such as those for large commercial LWR or IFR applications, ambiguous identification problems may potentially result in extremely costly shutdown of the reactor if the wrong assembly is removed from the core. Down time costs of a large commercial reactor are typically on the order of $1 million per day.

The present invention addresses the aforementioned limitations of the prior art by providing for the design of gas tags at reduced cost and minimized possibility of ambiguous leaker identification in the event of a double-assembly failure.

OBJECTS AND SUMMARY OF THE INVENTION

Accordingly, it is an object of the present invention to provide an improved method for designing gas tags for use in a nuclear reactor gas tagging failure detection system which minimizes the possibility of ambiguous leaker identification in the event of a double reactor assembly failure.

It is another object of the present invention to minimize enrichment requirements and associated gas costs for the noble gases to produce gas tags in a nuclear reactor gas tagging failure detection system.

Yet another object of the present invention is to more reliably produce gas tags for use in a nuclear reactor gas tagging failure detection system by reducing the effects of composition uncertainties in the tag blending procedure.

A further object of the present invention is to provide a method for assigning the composition of a plurality of tag gases for minimizing the possibility of ambiguous leaker identification and reducing tag gas production costs which can be carried out in several minutes using a standard office workstation.

This invention contemplates a method and a computerbased system for analytical design of gas tagging systems for identification of failed fuel assemblies in large nuclear reactors such as commercial light water reactors (LWRs) and Integral Fast Reactors (IFRs). This invention employs a modified genetic algorithm approach which computes the lattice locations of tag nodes in a multi-dimensional composition space in such a way that (1) the possibility of ambiguous leaker identification in the event of double-assembly failures is minimized; (2) the enrichment requirements (and hence gas costs) for the noble gases used to create the tags are minimized; and (3) the effects of composition uncertainties in the tag blending procedure do not compromise objectives (1) and (2).

More specifically, this invention contemplates a method for designing a tag gas for use in a nuclear reactor gas tagging failure detection system, wherein a plurality of tag gases each having a unique, predetermined composition are disposed in respective fuel canisters to provide an indication of a leak in one or more of the canisters, the method comprising the steps of: (a) designating a target composition of a first tag gas for use in a first fuel canister and filling the first fuel canister with the first tag gas; (b) determining the actual composition of the first tag gas; (c) representing the actual composition of the first tag gas as a first node on a surface of a sphere and the composition of a plurality of other tag gases as a plurality of remaining nodes on the surface of the sphere, wherein the distances on the sphere between each of the nodes is represented as a plurality of inter-nodal tie-lines; (d) randomly changing the location of each of the remaining nodes on the sphere; (e) determining the minimum distance on the sphere from each node to a tie-line connecting any two other nodes on the sphere; (f) selecting M remaining nodes which provide the longest distances from the nodes to tie-lines connecting any two other nodes and assigning the M nodes a fixed position on the surface of the sphere; (g) selecting N remaining nodes which provide the shortest distances from the nodes to tie-lines connecting any two other nodes; and (h) randomly changing the location of each of the N nodes on the sphere followed by again determining the minimum distance on the surface from each of the N nodes to a tie-line connecting any two other nodes on the sphere; (i) repeating steps (d)–(h), where each time N is reduced by one in eliminating those nodes having the shortest distance to any tie-line connecting any two other nodes until the maximum distance on the sphere for all of the remaining nodes to tie-lines connecting any two other nodes on the sphere has been determined; and (j) determining the M' node having the longest distance to tie-lines connecting any two other nodes on the sphere and designing a second tag gas with a composition represented by the location of the M' node on the sphere.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Described herein is an existing analytical tag design approach which is employed in carrying out a portion of the method for designing gas tag compositions of the present invention.

The first step of the design procedure is to compute a set of geometric cosines, $\mu_i$, with the equation $$\mu_i = \left[ \sin^2 \frac{\pi}{4N_I} + \frac{(i-1)}{(N_I-1)} \left( 1 - 3\sin^3 \frac{\pi}{4N_I} \right) \right]^{\frac{1}{2}}, \quad (1)$$

$$i = 1, 2, \ldots, N_I.$$

Equation (1) is derived from angular quadrature relationships used in discrete-ordinates approximations to the neutron transport equation.[1] Here, $N_I$, the number of cosines in the positive $\mu$ direction, is the subscript of the commonly used $S_n$ discrete-ordinates scheme. Use of Eq. (1) ensures that the resulting system of tag nodes will possess complete symmetry with respect to the origin, and that the distances between each node and all of its closest neighbors are equalized as nearly as possible.

B. G. CARLSON and K. D. LATHROP, in *Computing Methods in Reactor Physics*, p. 171, H. GREENSPAN, C. N. KELBER, and D. OKRENT, Eds., Gordon and Breach, Science Publishers, Inc., New York (1968).

Using the set of $\mu_i$ generated by Eq. (1), the locations of the tag nodes for the inner sphere are determined from $$(X^n, Y^n, Z^n)_I = (R_I \mu_i, R_I \mu_j, R_I \mu_k), \quad (2)$$
$$i = 1, 2, \ldots, N_I,$$
$$j = 1, 2, \ldots, (N_I - i + 1),$$
$$k = N_I + 2 - i - j,$$

where $(X^n, Y^n, Z^n)_I$ are the coordinates of tag node n on the surface of the inner sphere, and $R_I$ is the radius of the inner sphere. Note that as indices i and j vary from 1 to $N_I$ and from 1 to $(N_I - i + 1)$, respectively, n varies from 1 to $M_I$, where $M_I$, the total number of nodes on the inner sphere, is equal to $4N_I(N_I+1)$.

Figure 1:
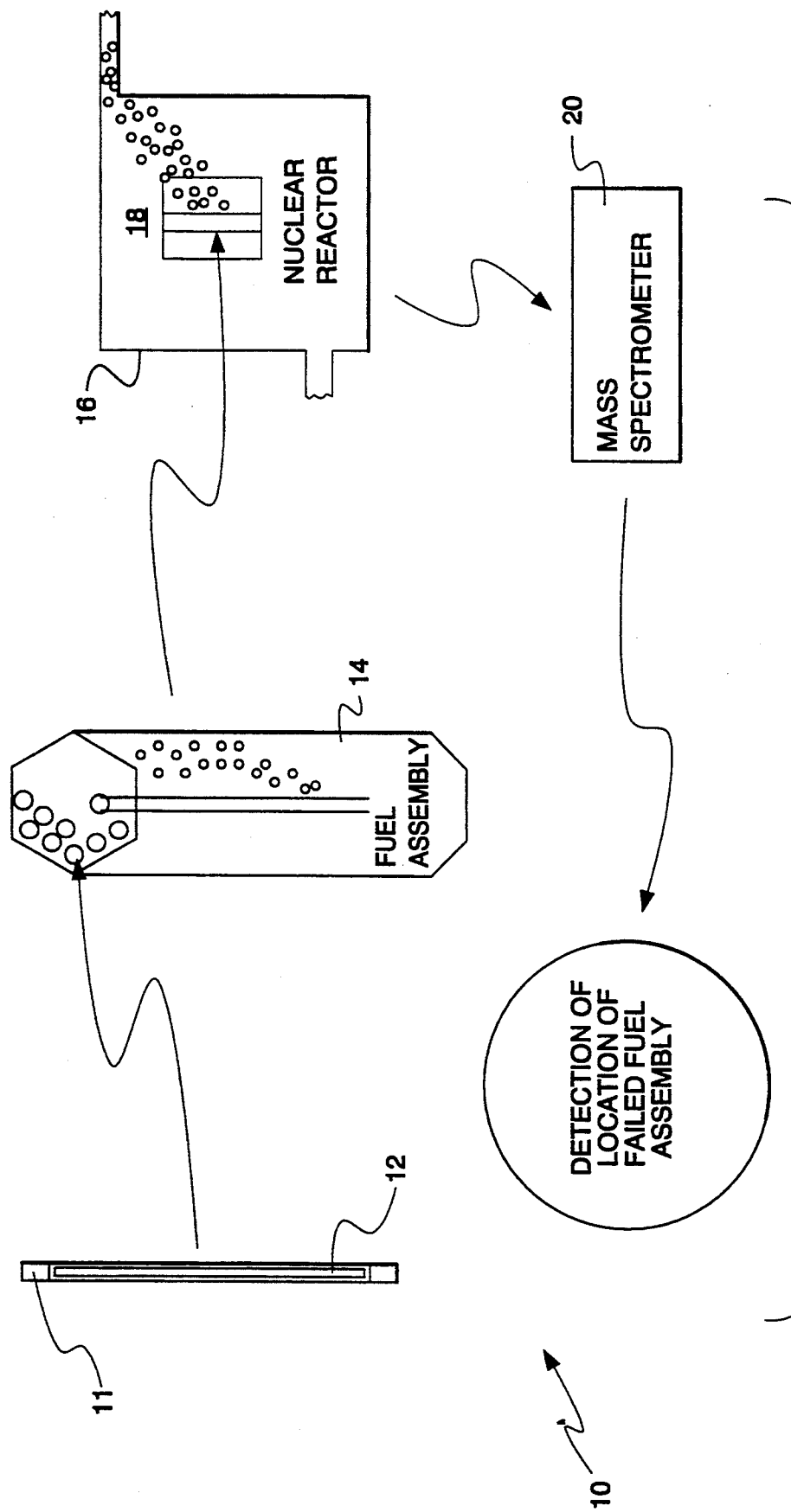
FIG. 1 is simplified conceptual illustration of gas tagging failure detection in a nuclear reactor.
Figure 2:
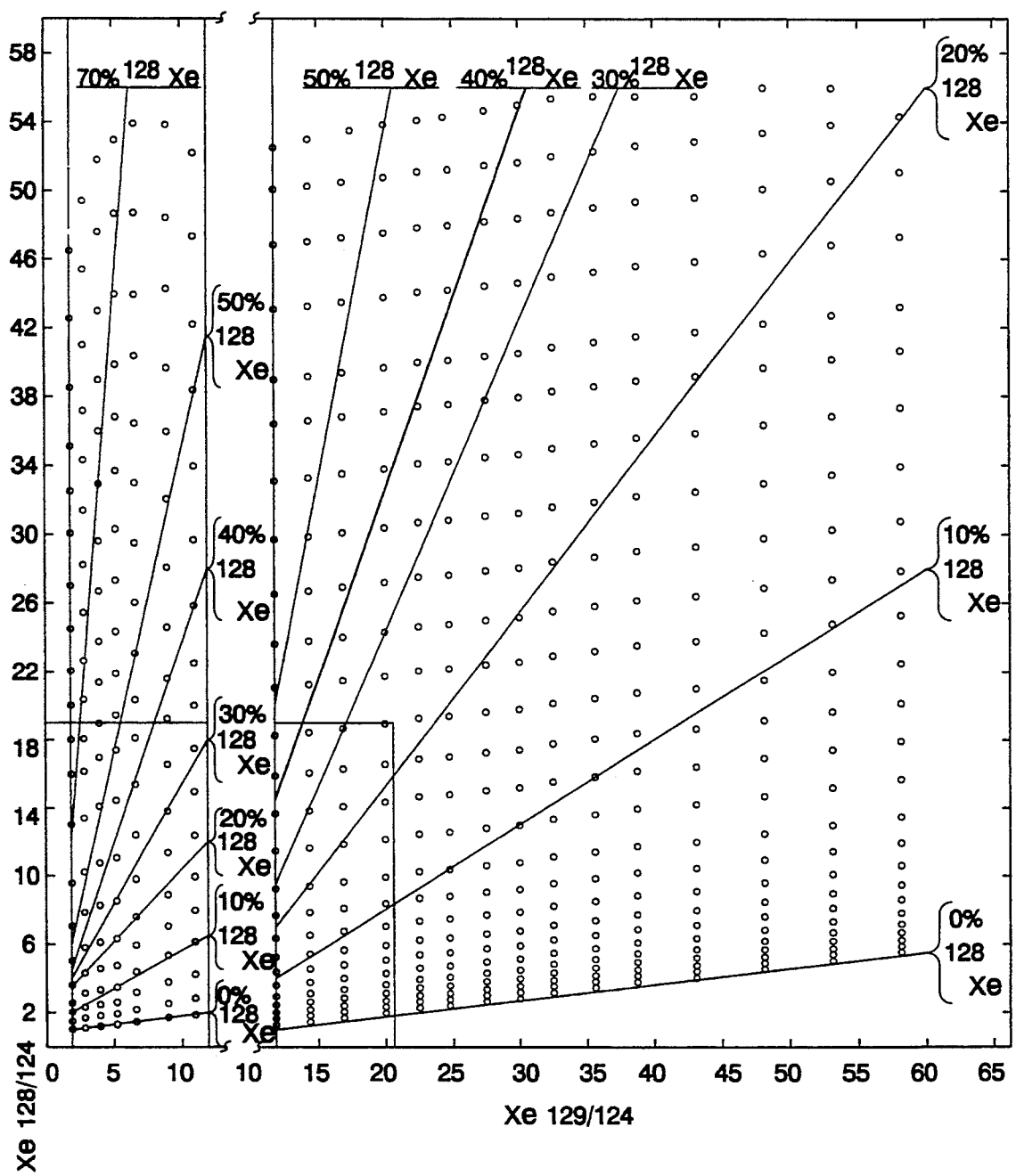
FIG. 2 is a graphic representation of a prior art control chart used in blending three feed gases in producing xenon gas tags.
Figure 3:
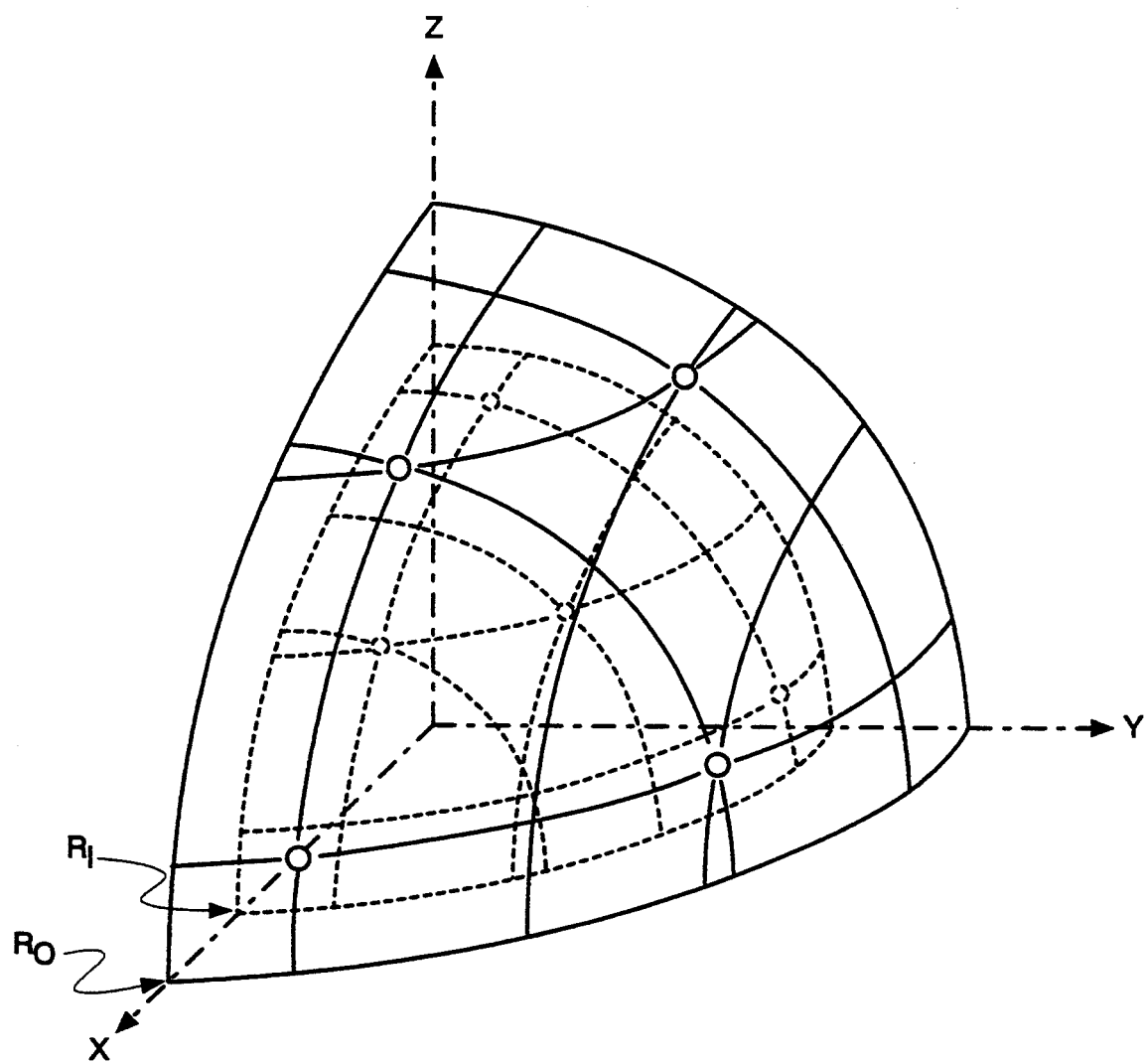
FIG. 3 is a geometric representation of tag nodes located uniformly across the surfaces of two concentric spheres, wherein only the positive octants of each sphere are shown in the figure.

After $M_I$ nodes are specified for the inner sphere, $M_O$ node locations are computed with the same equation for the outer sphere. The geometry of the resulting node arrangement is illustrated graphically in FIG. 1, which depicts a few nodes from the positive octants of each sphere. The relationship between the radii of the inner and outer spheres is given by $$R_O = 2R_I / \left[ \left( \frac{1}{2} \right)^{\frac{1}{2}} + \cos \frac{\pi(N_O+1)}{4N_O} \right]. \quad (3)$$

Use of Eq. 3 together with Eqs. (1) and (2) will minimize the overall cost of the system of tags. In general, the more spread out the system of tags becomes in tag-ratio space, the greater the enrichment requirements and, hence, the greater the overall costs for the noble gases used to create the tags. Use of Eq. (3) ensures that the system of tags will be packed as efficiently as possible into a given volume of ratio space.

The last independent variable, $R_I$, is determined by expanding the system of nodes isotropically about the (common) origin of the two spheres until the closest distance between any two nodes is greater than a minimum separation distance, $\tau$, thereby ensuring the ability to unambiguously identify single-element failures. The value of $\tau$ is left as an input variable and can be adjusted to allow for experimental uncertainties in the mass-spectrometer system used for the isotopic analyses, uncertainties associated with blending the tags, and, depending on the gases used, uncertainties in neutron burnout of the constituent isotopes.[2]

[2] Recent isotopic burnout correlations used at EBR-II are described in J. D. B. LAMBERT, B. Y. C. SO, F. S. KIRN, J. R. ARMSTRONG; E. R. EBERSOLE, and M. T. LAUG, "Recent Improvements in Identifying Fission Product Sources in the Experimental Breeder Reactor II," *Nucl. Technol.*, 39, 275 (1978).

The final step of the node-design procedure is systematic elimination of certain points that violate either of the following analytical constraints:

1. No four nodes in the system may lie in the same plane unless that plane is parallel to one of the three coordinate planes.
2. No tag node on the inner sphere can fall on a straight line connecting any two other tag nodes.

Constraint 1 ensures that the system of tags is amenable to a recently devised multiple-failure-analysis technique.[3] Constraint 2 ensures that single-assembly failures cannot be confused with double-assembly failures.

[3] K. C. GROSS, C. PASSERELLO, and A. SHAPIRO, "Barycentric Coordinates Technique for Resolution of Multiple Fuel Failures with Gas Tagging," *Trans. Am. Nucl. Soc.*, 27, 685 (1977).

If the number of tags remaining after elimination is less than the total number of tags required for the given reactor, then $N_I$ and/or $N_O$ are increased, and the procedure is repeated. When the required number of tag nodes is obtained, the entire system is translated rectilinearly to the positive octant of the Cartesian ratio space. The values of the component compositions for each node are then normalized appropriately so that the maximum value in each direction is spaced sufficiently far away from the corresponding background isotopic compositions.

Unfortunately, the locations of the tag nodes specified with an analytical design such as this concentric sphere design are not precise points in composition space as discussed above. This "movement" arises from experimental variations in the tag cylinder filling process and may result in erroneous failed assembly identification and removal from the reactor's core of the wrong fuel assemblies. Although it is impossible to totally eliminate the source of all inaccuracies in the tag blending procedure, the present invention provides a method for designing gas tag compositions which substantially reduces the possibility of misidentification of leaking fuel assemblies particularly in the case of multiple leaking fuel assemblies.

In accordance with the present invention, the present method for designing gas tag compositions solves the problem endemic to prior art approaches not by eliminating experimental uncertainties, but by accepting and accommodating these uncertainties with an iterative genetic algorithm approach that is run during the blending procedure. In prior art approaches, the node-design method (such as the concentric sphere method described above) would produce a table of all the target compositions for every required tag node. These target compositions would then be used to guide the gas blending operation. Unavoidable experimental uncertainties would result in small discrepancies between the target compositions and the measured final compositions.

The inventive method disclosed herein starts with a table of target compositions as in earlier approaches and uses the first target composition to blend the first canister of tag gas. When that canister of tag gas is produced, its final composition is measured accurately with a mass spectrometer. This measured composition is now used as the "true" location of node #1, and nodes 2, 3 . . . , NTAG (where NTAG is the total number of tags in the system) are adjusted using a genetic algorithm approach described in the following paragraphs.

Genetic algorithms are used in the analysis of complex phenomena and are derived from a simple heuristic assumption: that optimal solutions are located in regions of the search space containing relatively high numbers of good solutions, and that these solutions can be found by judicious sampling of the space. Genetic algorithms are further based upon two key axioms: (1) that non-biological structures may be described by simple bit strings and (2) that these structures may be improved by the application of simple transformations to these strings. A genetic algorithm controls the representation and alteration of such strings in order to evolve well-adapted solutions to the optimization problem under consideration. The basic approach undertaken in and operation of genetic algorithms is described in *Advances in Nuclear Science and Technology*, Vol. 21, J. Lewins and M. Becker (editors), Plenum Press, New York, New York (1990).

Figure 4:
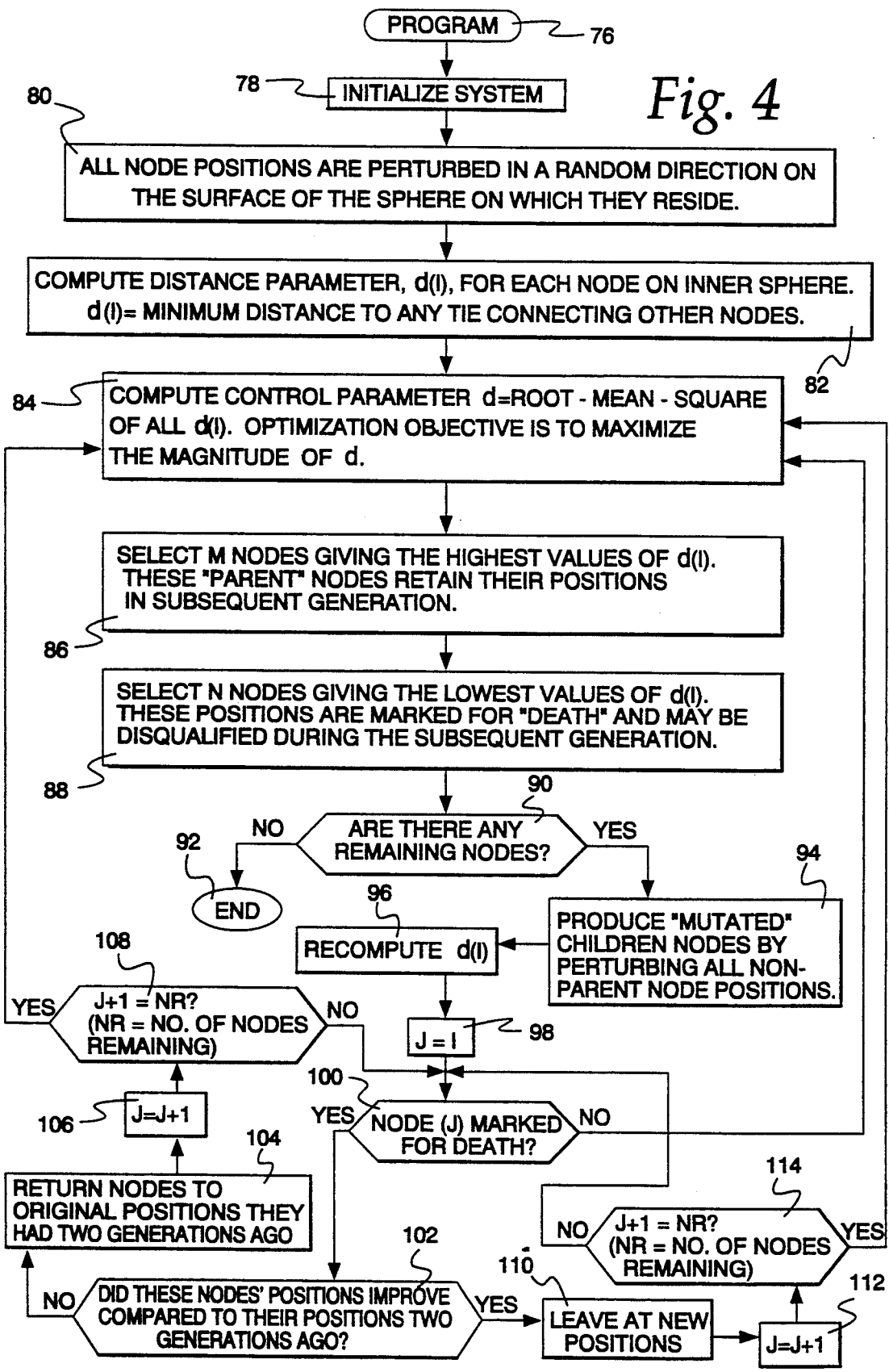
FIG. 4 is a flow chart illustrating the steps carried out in accordance with the method for designing gas tag compositions of the present invention.

Referring to FIG. 4, there is shown a flow chart illustrating the sequence of steps in carrying out the method for designing gas tag compositions of the present invention. In FIG. 4, an oval symbol indicates the start of an operational sequence, a rectangle indicates an instruction or set of instructions resulting in the performance of a control function, and a hexagon indicates a decision based upon the comparison of binary signals within a microprocessor controller which is described below.

At step 76, the operation of a program stored in a microprocessor controller for designing gas tag compositions is initiated. At step 78, the microprocessor controller is initialized by resetting its control flags to an initial set of conditions whereupon the microprocessor controller is ready for controlling apparatus for manufacturing gas tags, which apparatus is described in detail below.

At step 80, the program in the microprocessor controller perturbs all node positions on the inner and outer tag spheres described above in a random direction. The random direction selected is constrained in that the node does not leave the surface of the sphere on which it resides. The program next, at step 82, then computes a distance parameter, d(I), for each node on the inner sphere, where d(I) is the minimum distance to any tie-line connecting other nodes in the system. The distance d(I) is the shortest distance between a node and a tie line connecting any two other nodes, with the goal being to maximize the distance parameter at a later step in the process.

At step 84, the program computes a control parameter D by taking the root-mean-square of all d(I)'s, where $$D = \sqrt{dI_1^2 + dI_2^2 + DI_3^2 + \ldots + dI_N^2} \quad (4)$$

The overall objective of the inventive method is to maximize the magnitude of the control parameter D, while adhering to the analytical constraint that the target tag nodes do not leave the surfaces of their respective spheres. The program at step 86 then selects M nodes from the population of remaining nodes that give the highest, or best, values of d(I). The selected M nodes can be on either of the concentric spheres, with d(I) connecting nodes on the inner and outer spheres. Those M nodes which give the highest values of d(I) are termed "parent" nodes and retain their positions in the subsequent generation, or during subsequent steps in the process. The program at step 88 then selects N nodes from the population of remaining nodes that give the lowest, or poorest, values of d(I) and these N node positions are marked for "death" and may be disqualified during the subsequent generation. Those nodes are designated as "children nodes". In one embodiment, M=N which simplifies calculations in carrying out the inventive method.

The program then proceeds to step 90 to determine if there are any remaining nodes. If there are no remaining nodes, the program proceeds to step 92 and ends. If, at step 90, it is determined that there are remaining nodes present, the program proceeds to step 94 and holds the parent nodes fixed, while producing "mutated" children nodes by perturbing all non-parent node positions and reevaluating the new d(I) values. The new d(I) values for the mutated children nodes are recomputed at step 96 with the value of the first (J=1) remaining node determined at step 98. From step 98, the program proceeds to step 100 to determine if the J node has been marked for death. If the J node has not been marked for death, the program branches to step 84 and again computes the control parameter D of all d(I)'s. If at step 100 it is determined that the J node has been marked for death, the program, at step 102, determines whether the position of the node has improved compared to its position two generations ago. If at step 100 it is determined that the node's position has not improved as compared to its position two generations ago, the program branches to step 104 and returns the node to its original position it had two generations ago, followed by an incrementing by one of the value of J to the next node at step 106. The program then determines, at step 108, if J+1 is equal to the number of nodes remaining, or to the number of nodes which have not yet been fixed in position. If J+1 equals the number of remaining nodes, the program branches to step 84 for again computing the control parameter D for all nodes. If at step 108 it is determined that J+1 does not equal the number of nodes remaining, the program branches to step 100 to determine if the J+1 node has been marked for death.

If at step 102 it is determined that the J+1 node's position has improved compared to its position two generations ago, the program branches to step 110 and fixes the position of the node at its new location. The program then increments J by one at step 112 and at step 114 determines whether the J+1 node is equal to the number of remaining nodes. If J+1 is equal to the number of remaining nodes, the program branches to step 84 and again computes the control parameter D for all nodes. If at step 114 it is determined that J+1 is not equal to the number of nodes remaining, the program branches to step 100 and determines whether the J+1 node has been marked for death. The program then proceeds as previously described.

Figure 5:
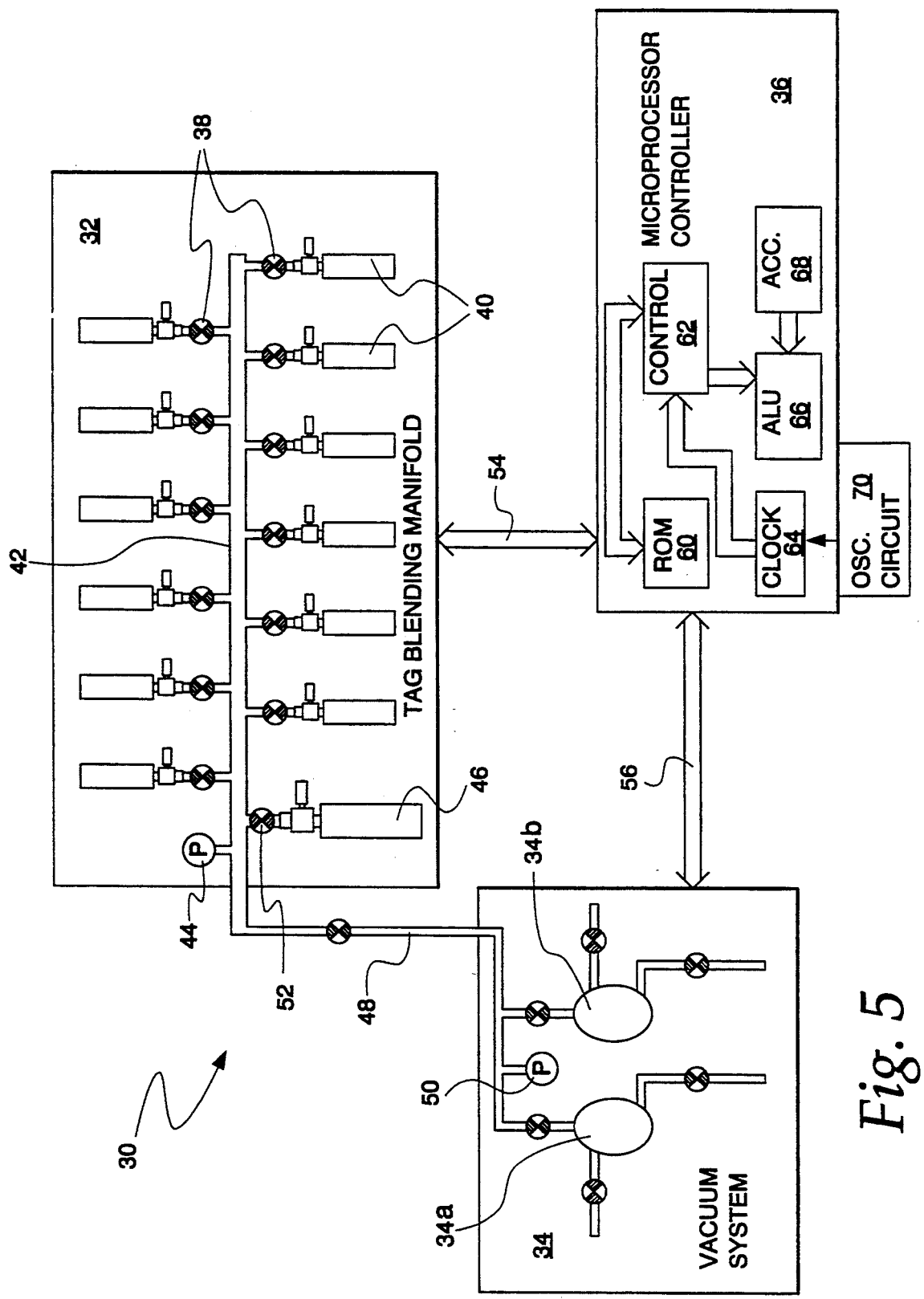
FIG. 5 is a simplified schematic and block diagram of an arrangement for manufacturing gas tags employing the gas tag composition design method of the present invention.

Referring to FIG. 5, there is shown a simplified schematic and block diagram of a tag gas blending system 30 for designing gas tag compositions in accordance with the method of the present invention. The present invention is not limited to use with the gas tag blending system 30 of FIG. 5, but can be used with virtually any conventional gas tag blending system. The gas tag blending system 30 of FIG. 5 is disclosed and claimed in co-pending application, Ser. No. 08/174,146, filed Dec. 28, 1993, and assigned to the assignee of the present application, the disclosure of which is hereby incorporated by reference in the present application. Tag gas blending system 30 includes a tag blending manifold 32, a vacuum system 34 and a microprocessor-based controller 36. Tag blending manifold 32 includes a stainless steel manifold 42 to which are coupled a plurality of filling gas cylinders, or canisters, 40. Each of the filling gas cylinders 40 is coupled to the tag blending manifold 32 by means of a respective microprocessor-controlled valve 38. Each of the valves 38 is coupled to and controlled by microprocessor controller 36 for opening and closing each of the individual valves and connecting its associated gas cylinder 40 to manifold 42. Microprocessor controller 36 is coupled to the tag blending manifold 32 by means of a first control/communication bus 54 by means of which control signals are provided from the microprocessor controller to each of the valves 38 and also by means of which status signals relating to each of the valves is provided to the microprocessor controller. Each of the filling gas cylinders 40 contains a feed gas having a specified composition. Manifold 32 couples each of the filling gas cylinders 40 to a blended tag canister 46 for filling the blended tag canister with metered quantities of each of the feed gases in the filling gas cylinders 40. The metering is accomplished by means of microprocessor controller 36 which also is coupled to a tag gas canister valve 52 to allow for introduction into the blended tag gas canister 46 of the required feed gases to provide a tag gas having a designated composition.

Vacuum system 34 is coupled by means of a vacuum line 48 to manifold 42 within the tag blending manifold 32. A first pressure transducer 44 is coupled to manifold 42 in the tag blending manifold 32, while a second pressure transducer 50 is coupled to vacuum line 48 within vacuum system 34. Vacuum system 34 is further coupled to controller 36 by means of a second control/communication bus 56. Microprocessor controller 36 controls the operation of vacuum system 34 in forming a vacuum within manifold 42 for drawing various of the feed gases within the filling gas cylinders 40 into the blended tag canister 46. Two pumps 34a and 34b are shown in the vacuum system 34 for drawing feed gases from the filling gas cylinders 40 into the blended tag canister 46 via manifold 42. In a typical tag gas blending system, X tag isotopes for Y distinct feed gas mixtures commercially available from an enriched gas supplier are used to fill blended tag canister 46 with a tag gas having a designated composition. The procedure typically involves opening one of the valves connected to one of the filling gas cylinders, drawing off a predetermined amount of feed gas, closing the valve to the filling gas cylinder as well as the valve to the blended tag canister, and purging the gas line before introducing another feed gas to the blended tag canister in forming the tag gas blend.

Microprocessor controller 36 includes a ROM 60, a clock 64, an accumulator (ACC) 68, a controller 62 and an arithmetic and logic unit (ALU) 66. Microprocessor controller 36 stores instructions and data, periodically updates the stored data, compares both stored and real-time data and makes decisions based upon these comparisons by means of logic instructions in providing control for the tag gas blending system 30. An oscillator circuit 70 external to the microprocessor controller 36 provides timing signals to clock 64 for controlling the timing of operations carried out by the microprocessor controller. Program instructions and data and the sequence of steps carried out under the control of microprocessor controller 36 are illustrated in FIG. 4 and described in detail above.

There has thus been shown an improved method for designing gas tagging compositions for use in identification of failed fuel assemblies in a nuclear reactor. The inventive method employs an analytical approach wherein the final composition of a first canister of tag gas as measured by a spectrometer is designated as node #1. Lattice locations of tag nodes in multi-dimensional space are then used in calculating the compositions of a node #2 and each subsequent node so as to maximize the distance of each node from any combination of tag components which might be indistinguishable from another tag composition in a reactor fuel assembly. This is accomplished by employing a genetic algorithm which improves the gene pool with time as undesirable mutated children nodes are eliminated from consideration. The method employs a sequential approach wherein the measured compositions of tag gas numbers 1 and 2 are used to fix the locations of nodes 1 and 2, with the locations of nodes 3-N then calculated for optimum tag gas composition. The geometric space representing inter-nodal spacing is in the form of one or more concentric spheres defining lattice locations of the tag nodes.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A method for designing a tag gas for use in a nuclear reactor gas tagging failure detection system, wherein a plurality of tag gases each having a unique, predetermined composition are disposed in respective fuel canisters to provide an indication of a leak in one or more of said canisters, said method comprising the steps of:

(a) designating a target composition of a first tag gas for use in a first fuel canister and filling said first fuel canister with said first tag gas;
   (b) determining the actual composition of said first tag gas;
   (c) representing the actual composition of said first tag gas as a first node on a surface of a sphere and the composition of a plurality of other tag gases as a plurality of remaining nodes on the surface of said sphere, wherein the distances on said sphere between each of said nodes is represented as a plurality of internodal tie-lines;
   (d) randomly changing the location of each of said remaining nodes on said sphere;
   (e) determining the minimum distance on said sphere from each node to a tie-line connecting any two other nodes on said sphere;
   (f) selecting M remaining nodes which provide the longest distances from the nodes to tie-lines connecting any two other nodes and assigning said M nodes a fixed position on the surface of said sphere;
   (g) selecting N remaining nodes which provide the shortest distances from the nodes to tie-lines connecting any two other nodes;
   (h) randomly changing the location of each of said N nodes on said sphere followed by again determining the minimum distance on said surface from each of said N nodes to a tie-line connecting any two other nodes on said sphere;
   (i) repeating steps (d)-(h), where each time N is reduced by one in eliminating those nodes having the shortest distance to any tie-line connecting any two other nodes until the maximum distance on said sphere for all of the remaining nodes to tie-lines connecting any two other nodes on said sphere has been determined; and
   (j) determining the M' node having the longest distance to tie-lines connecting any two other nodes on said sphere and designing a second tag gas with a composition represented by the location of the M' node on said sphere.

2. The method of claim 1 wherein the step of determining the actual composition of said first tag gas includes measuring the composition of said first tag gas with a mass spectrometer.

3. The method of claim 1 wherein the step of determining the minimum distance on said sphere from each node to a tie-line connecting any two other nodes on said sphere includes computing a distance parameter $d(I)$ for each node, where $d(I)$ is the minimum distance to any tie-line connecting other nodes on said sphere.

4. The method of claim 3 wherein the step of determining minimum distance on said sphere further includes the step of taking the root-mean-square of the minimum distance of each node to any tie-line connecting other nodes on said sphere.

5. The method of claim 4 wherein the step of randomly changing the location of each of said N nodes on said sphere includes returning a node position to its location two steps earlier and again determining the minimum distance from said node to a tie-line connecting any two other nodes before eliminating said node.

6. The method of claim 1 further including the step of representing the actual composition of said first tag gas on a surface of a first sphere and the composition of a plurality of other tag gases on the surface of said first sphere or the surface of a second sphere concentric with said first sphere, and wherein said minimum distance is between nodes on either said first or said second sphere or is between nodes on said first and second spheres.

7. The method of claim 1 further comprising the step of measuring the actual composition of said second tag gas in verifying the method of designing said second tag gas.

8. The method of claim 1 wherein $M = N$.

9. The method of claim 1 wherein said nuclear reactor gas tagging failure system includes X tag gases, and wherein said method further includes repeating steps (c)-(j) for all X tag gases.

* * * * *

UNITED STATES PATENT AND TRADEMARK OFFICE
CERTIFICATE OF CORRECTION

PATENT NO. : 5,406,605
DATED : April 11, 1995
INVENTOR(S) : Kenny C. Gross

It is certified that error appears in the above-indentified patent and that said Letters Patent is hereby corrected as shown below:

On the front page of the patent, at [73] change the Assignee from "Kenny C. Gross" to --The University of Chicago, Chicago, Illinois--.

Signed and Sealed this

Thirty-first Day of December, 1996

Attest:

BRUCE LEHMAN

Attesting Officer    Commissioner of Patents and Trademarks